United States Patent
Subramanian et al.

(10) Patent No.: US 12,482,261 B2
(45) Date of Patent: Nov. 25, 2025

(54) SYSTEMS AND METHODS FOR VISION SYSTEM TRACKING IN AN ENVIRONMENT BASED ON DETECTED MOVEMENTS AND DWELL TIME

(71) Applicant: Sensormatic Electronics, LLC, Boca Raton, FL (US)

(72) Inventors: Gopi Subramanian, Delray Beach, FL (US); Joseph Celi, Boca Raton, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 32 days.

(21) Appl. No.: 18/578,574

(22) PCT Filed: Jul. 12, 2022

(86) PCT No.: PCT/US2022/073628
§ 371 (c)(1),
(2) Date: Jan. 11, 2024

(87) PCT Pub. No.: WO2023/288212
PCT Pub. Date: Jan. 19, 2023

(65) Prior Publication Data
US 2024/0312209 A1    Sep. 19, 2024

Related U.S. Application Data

(60) Provisional application No. 63/221,666, filed on Jul. 14, 2021.

(51) Int. Cl.
*G06V 20/52* (2022.01)
*G06V 10/10* (2022.01)
(Continued)

(52) U.S. Cl.
CPC .............. *G06V 20/44* (2022.01); *G06V 20/52* (2022.01)

(58) Field of Classification Search
CPC ........ G06V 20/44; G06V 20/52; G06V 10/00; G06V 20/00; G06V 30/00; G06V 40/00; G06V 2201/00
(Continued)

(56) References Cited

U.S. PATENT DOCUMENTS

| 5,465,115 A | 11/1995 | Conrad et al. |
| 6,697,104 B1 | 2/2004 | Yakobi et al. |

(Continued)

FOREIGN PATENT DOCUMENTS

| BR | 0302988 A | 3/2005 |
| BR | PI0302988 B1 | 7/2017 |

(Continued)

OTHER PUBLICATIONS

International Search Report and Written Opinion issued in corresponding International Application No. PCT/US2022/073628 dated Nov. 11, 2022.

(Continued)

*Primary Examiner* — Daquan Zhao
(74) *Attorney, Agent, or Firm* — ArentFox Schiff LLP

(57) ABSTRACT

Disclosed herein are apparatuses and methods for tracking occupancy count in an environment based on detected movements and dwell time. An implementation may comprise detecting a person in a plurality of image frames captured by a camera. The implementation may comprise tracking a movement of the person and determining that the person has crossed a boundary within the plurality of image frames. The implementation may comprise identifying a path of the person based on the tracked movement and may comprise calculating a dwell time in response to determining (Continued)

that a difference between the identified path and at least one target path associated with entering or exiting the environment exceeds a threshold difference. The implementation may comprise comparing the dwell time to a target dwell time, and updating and storing the occupancy count of the environment in response to determining that the dwell time is less than the target dwell time.

23 Claims, 3 Drawing Sheets

(51) Int. Cl.
*G06V 20/40* (2022.01)
*G06V 20/00* (2022.01)

(58) Field of Classification Search
USPC .................. 348/61, 135, 142, 129, 130, 169
See application file for complete search history.

(56) References Cited

U.S. PATENT DOCUMENTS

| | | |
|---|---|---|
| 2004/0145658 A1 | 7/2004 | Lev-Ran et al. |
| 2006/0067456 A1 | 3/2006 | Ku et al. |
| 2012/0249790 A1 | 10/2012 | Golan et al. |
| 2014/0355829 A1* | 12/2014 | Heu .......................... G06T 7/20 382/103 |
| 2016/0314597 A1 | 10/2016 | Wang et al. |
| 2019/0122381 A1* | 4/2019 | Long ..................... G06V 10/96 |
| 2019/0220655 A1 | 7/2019 | Prashant et al. |
| 2019/0251364 A1* | 8/2019 | Park ....................... G06V 20/47 |
| 2023/0230382 A1 | 7/2023 | Stewart et al. |
| 2024/0312213 A1 | 9/2024 | Stewart et al. |

FOREIGN PATENT DOCUMENTS

| | | |
|---|---|---|
| CN | 106251363 A | 12/2016 |
| CN | 107292909 A | 10/2017 |
| CN | 109697435 A | 4/2019 |
| CN | 109753842 A | 5/2019 |
| CN | 110 659 578 A | 1/2020 |
| CN | 107103299 B | 3/2020 |
| CN | 111160101 A | 5/2020 |
| CN | 113988111 A | 1/2022 |
| CN | 115063728 A | 9/2022 |
| CN | 115830546 A | 3/2023 |
| CN | 117315539 A | 12/2023 |
| CN | 117975351 A | 5/2024 |
| CN | 112116556 B | 7/2024 |
| CN | 118799795 A | 10/2024 |
| CN | 119672602 A | 3/2025 |
| CN | 119888562 A | 4/2025 |
| EP | 2913798 A2 | 9/2015 |
| IN | 201841001347 A | 7/2019 |
| IN | 202341053152 A | 9/2023 |
| WO | 2013/043590 A1 | 3/2013 |

OTHER PUBLICATIONS

Rudenko, et al: "Human Motion Trajectory Prediction: A Survey", arxiv.org, Cornell University Library, 201 Olin Library Cornell University Ithaca, NY 14853, May 15, 2019 (May 15, 2019), XP081371049 the whole document.

* cited by examiner

SYSTEMS AND METHODS FOR VISION SYSTEM TRACKING IN AN ENVIRONMENT BASED ON DETECTED MOVEMENTS AND DWELL TIME

CROSS-REFERENCE TO RELATED APPLICATIONS

This application is a 35 U.S.C. § 371 National Phase of PCT Application No. PCT/US2022/073628, filed on Jul. 12, 2022, which claims the benefit of U.S. Provisional Application No. 63/221,666, filed Jul. 14, 2021, the disclosures of which are hereby incorporated by reference herein in their entireties.

TECHNICAL FIELD

The described aspects relate to security systems that comprise object detection features.

BACKGROUND

Aspects of the present disclosure relate generally to vision systems that may be used for security, and more particularly to object detection.

Vision systems may be used to detect objects in an environment. In some implementations, for example, vision systems may include object detection and counting capabilities. For instance, in some cases, the object may be a person, and the object counting may be used for determining occupancy counts, which is important for fields such as security, marketing, and health. For example, a user of a security system may be interested in knowing how many people have entered/exited a theater with a fire code occupancy limit. An owner of a shopping mall may be interested in knowing how many people enter different stores to evaluate popularity. Office personnel may be interested in knowing how many people have entered an office to enforce health-based regulations (e.g., limit the occupancy count to prevent the spread of a virus).

Conventional systems, however, often fail to provide accurate detection and/or counts due to sub-par detection algorithms and unrecognized movements by people in the environment (e.g., children running in circles, security officers patrolling near the entrance/exit point). Accordingly, there exists a need for improvements in such vision systems with objection detection/counting capabilities.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method for tracking occupancy count in an environment based on detected movements, comprising detecting a person in a plurality of image frames captured by a camera, wherein the plurality of image frames depict an access point providing egress and ingress to the environment. The method further includes tracking a movement of the person in the plurality of image frames. The method further includes determining that the person has crossed a boundary within the plurality of image frames. The method further includes identifying a path of the person based on the tracked movement. The method further includes comparing the identified path with at least one target path associated with entering or exiting the environment. The method further includes calculating a dwell time indicative of an amount of time that the person remains within the plurality of image frames, in response to determining, based on the comparison, that a difference between the identified path and the at least one target path exceeds a threshold difference. The method further includes comparing the dwell time to a target dwell time, and updating the occupancy count of the environment in response to determining, based on the comparison, that the dwell time is less than the target dwell time and storing, in a memory, an updated value for the occupancy count.

Another example implementation includes an apparatus for tracking occupancy count in an environment based on detected movements, comprising a memory and a processor communicatively coupled with the memory. The processor is configured to detect a person in a plurality of image frames captured by a camera, wherein the plurality of image frames depict an access point providing egress and ingress to the environment. The processor is configured to track a movement of the person in the plurality of image frames. The processor is configured to determine that the person has crossed a boundary within the plurality of image frames and identify a path of the person based on the tracked movement. The processor is configured to compare the identified path with at least one target path associated with entering or exiting the environment. The processor is configured to calculate a dwell time indicative of an amount of time that the person remains within the plurality of image frames, in response to determining, based on the comparison, that a difference between the identified path and the at least one target path exceeds a threshold difference. The processor is configured to compare the dwell time to a target dwell time, and update the occupancy count of the environment in response to determining, based on the comparison, that the dwell time is less than the target dwell time and store, in the memory, an updated value for the occupancy count.

Another example implementation includes an apparatus for tracking occupancy count in an environment based on detected movements, comprising means for detecting a person in a plurality of image frames captured by a camera, wherein the plurality of image frames depict an access point providing egress and ingress to the environment. The apparatus further includes means for tracking a movement of the person in the plurality of image frames. The apparatus further includes means for determining that the person has crossed a boundary within the plurality of image frames and identifying a path of the person based on the tracked movement. The apparatus further includes means for comparing the identified path with at least one target path associated with entering or exiting the environment. The apparatus further includes means for calculating a dwell time indicative of an amount of time that the person remains within the plurality of image frames, in response to determining, based on the comparison, that a difference between the identified path and the at least one target path exceeds a threshold difference. The apparatus further includes means for comparing the dwell time to a target dwell time, updating the occupancy count of the environment in response to determining, based on the comparison, that the dwell time is less than the target dwell time and storing, in a memory, an updated value for the occupancy count.

Another example implementation includes a computer-readable medium storing instructions, for tracking occupancy count in an environment based on detected movements, executable by a processor to detect a person in a plurality of image frames captured by a camera, wherein the plurality of image frames depict an access point providing egress and ingress to the environment. The instructions are further executable to track a movement of the person in the plurality of image frames. The instructions are further executable to determine that the person has crossed a boundary within the plurality of image frames. The instructions are further executable to identify a path of the person based on the tracked movement. The instructions are further executable to compare the identified path with at least one target path associated with entering or exiting the environment. The instructions are further executable to calculate a dwell time indicative of an amount of time that the person remains within the plurality of image frames, in response to determining, based on the comparison, that a difference between the identified path and the at least one target path exceeds a threshold difference. The instructions are further executable to compare the dwell time to a target dwell time, update the occupancy count of the environment in response to determining, based on the comparison, that the dwell time is less than the target dwell time, and store, in a memory, an updated value for the occupancy count.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The present disclosure includes apparatuses and methods that provide tracking occupancy count in an environment based on detected movements and dwell time. Because unorthodox trajectories can throw a conventional occupancy counting system off, leading to inaccurate person tracking, the present disclosure utilizes both trajectories and dwell time to evaluate whether to count whether a person has truly entered/exited an environment.

In a computer vision artificial intelligence (A.I.) occupancy counting system, the goal is to accurately count the number of people entering and exiting a monitored location. Attaining high accuracy (e.g., over 95%) has proven to be an extremely difficult feat. Even non-A.I. counting systems experience similar accuracy challenges. For the computer vision-based A.I. system, there are many common challenges with respect to the actual video frame used for inference such as video frame scene challenges (e.g., image quality will degrade when the network becomes congested, occlusion, varying lighting conditions, and crowding). Besides the normal challenges listed above, counting accuracy suffers additional behavioral challenges such as a security guard by entrance/exit moving about, people convening near the entrance/exit, indecisive people coming in and back out frequently, and business associates and workers that appear to either be entering or exiting but are really just working in the area. The present disclosure addresses the behavioral challenges using algorithms and analysis on the path, trajectory, and dwell time of the people tracked in the zone.

The present disclosure describes using the output of an object tracker to perform a path analysis, which will be used to correct over counting. The algorithms also improve over time as more data is collected. Once sufficient data has been collected, the distinction between directed and undirected traffic will become more easily distinguishable. Previous counts will be corrected and real-time counting will become more stringent. In a similar manner, dwell time in the exit/entrance area will also be utilized for corrections of prior data along with improving current counting accuracy.

Figure 1:
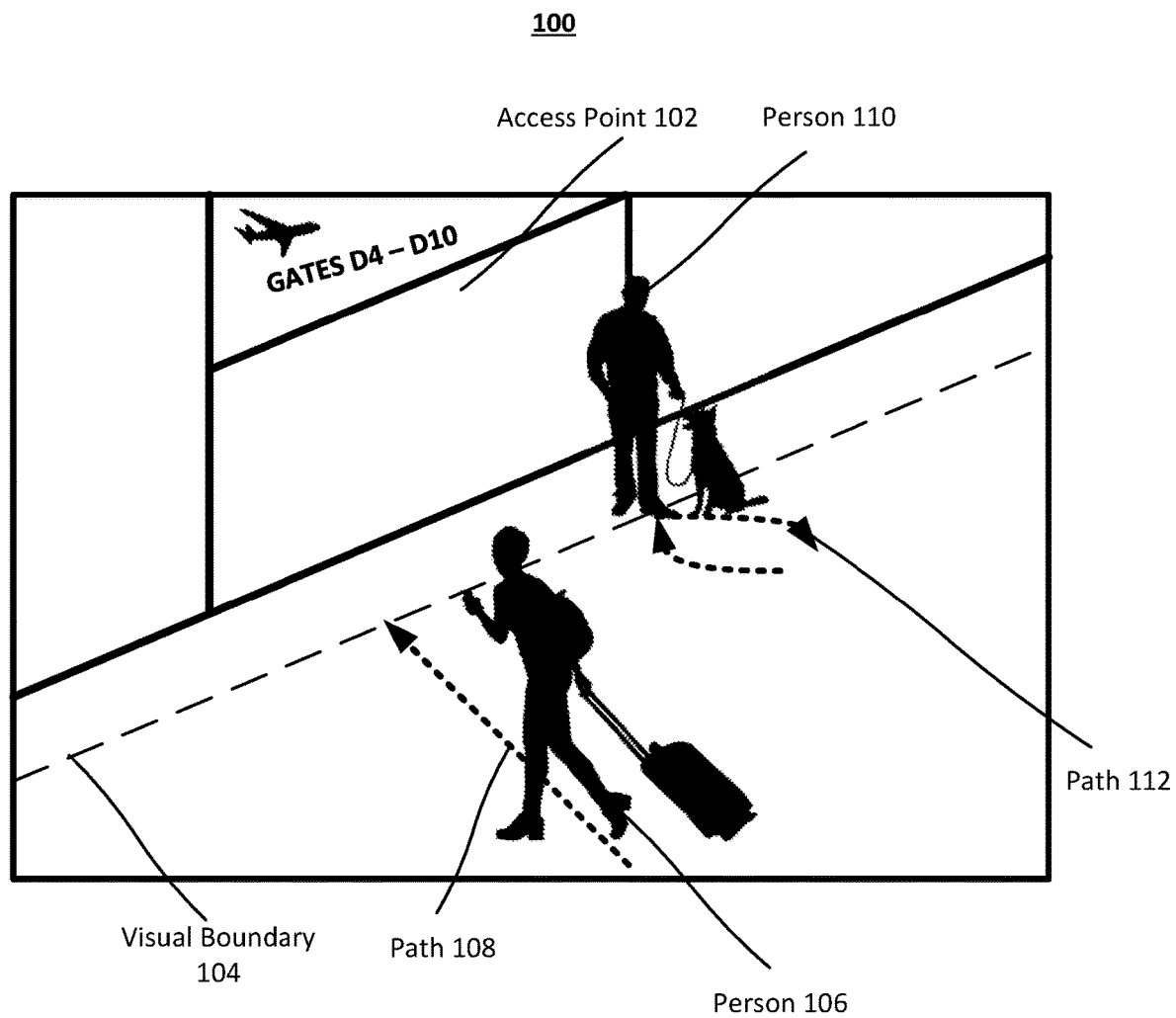
FIG. 1 is a diagram of an image frame captured by a camera in an environment and depicts trajectories of people captured in the image frame, in accordance with exemplary aspects of the present disclosure.

FIG. 1 is a diagram of image frame 100 captured by a camera in an environment and depicts trajectories of people captured in the image frame, in accordance with exemplary aspects of the present disclosure. FIG. 1 depicts a portion of an airport that includes access point 102. Access point 102 may be a traditional door, sliding doors, a revolving door, a wall cut-out, etc. Person 106 may be a passenger that intends to pass through access point 102 in order to access gates D4-D10 of the airport. In contrast, person 110 may be a security guard that is patrolling the area. Boundary 104 may be a predetermined line of pixels that serves as a crossing point. In some aspects, boundary 104 is a virtual boundary that can be set based on physical landmarks (e.g., doors, lines on the floor, etc.) If a person crosses boundary 104, they will likely enter or exit the environment. In some aspects, boundary 104 may have a different slope, curvature, segments, position, etc., based on used preferences (e.g., of a user monitoring occupancy using the security system).

The present disclosure describes an occupancy counting (OC) component of a security/vision system that utilizes computer vision to determine whether a person has entered or exited the environment. The OC component may detect person 110 and person 106 and determine, based on their movements, each of their paths—path 108 for person 106 and path 112 for person 110. In some aspects, a given path is a combination of vectors. The OC component may then compare each path to a target path for entering/exiting the environment via access point 102 in response to determining that person 110 and person 106 have crossed boundary 104. In some aspects, the OC component may treat each person as a point object (e.g., a point in the torso, head, or leg of a given person). Thus, when the point changes position from one portion of the image frame to another portion (wherein the portions are divided by boundary 104), the OC component may determine that the person will potentially enter/exit the environment.

In FIG. 1, the OC component may determine that path 108 matches the target path, but path 112 does not match the target path. Because path 108 matches the target path, the occupancy count can be updated for person 106. In this case, the trajectory of person 106 shows that person 106 is exiting the environment. Accordingly, the OC component decrements the occupancy count by 1. Because path 112 does not match the target path, the OC component determines a dwell time for person 110. The dwell time is an amount of time that person 110 is continuously captured by the camera in a plurality of image frames. If the dwell time is greater than a predetermined target dwell time, the OC component does not update the occupancy count (as person 110 may not have any intention to leave or enter the environment). In some aspects, the target dwell time is an average dwell time calculated based on historic ingress and egress data associated with the access point.

In some aspects, the environment has a plurality of access points, and each access point has at least one target path associated with entering the environment and at least one target path associated with exiting the environment. The OC component may accordingly select the at least one target path to compare with the identified path based on the access point depicted in the plurality of image frames.

Figure 2:
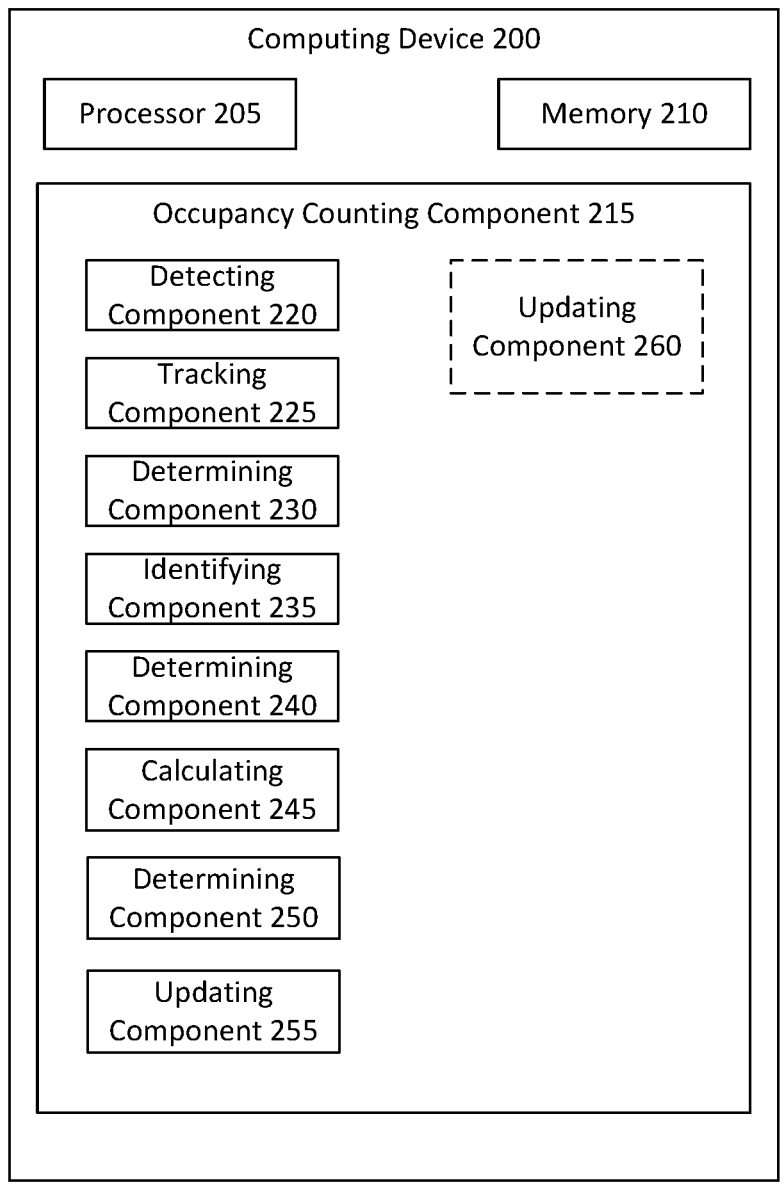
FIG. 2 is a block diagram of a computing device executing an occupancy counting component, in accordance with exemplary aspects of the present disclosure.
Figure 3:
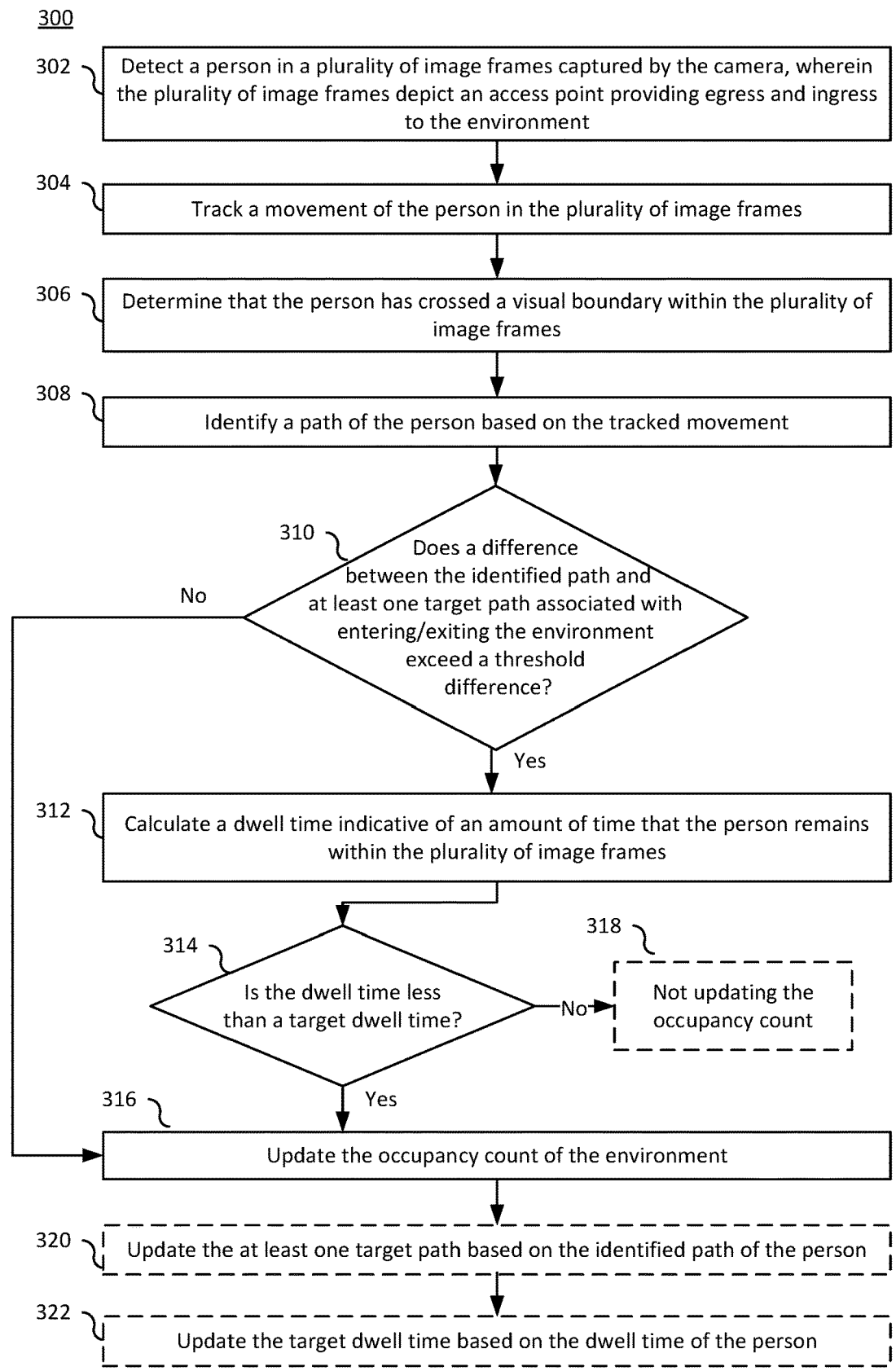
FIG. 3 is a flowchart illustrating a method of tracking occupancy count in an environment based on detected movements and dwell time, in accordance with exemplary aspects of the present disclosure.

FIG. 2 is a block diagram of computing device 200 executing occupancy counting (OC) component 215, in accordance with exemplary aspects of the present disclosure. FIG. 3 is a flowchart illustrating method 300 of tracking occupancy count in an environment based on detected movements and dwell time, in accordance with exemplary aspects of the present disclosure. Referring to FIG. 2 and FIG. 3, in operation, computing device 200 may perform method 300 of tracking occupancy count in an environment based on detected movements and dwell time via execution of OC component 215 by processor 205 and/or memory 210.

At block 302, the method 300 includes detecting a person in a plurality of image frames captured by the camera, wherein the plurality of image frames depict an access point providing egress and ingress to the environment. For example, in an aspect, computer device 200, processor 205, memory 210, OC component 215, and/or detecting component 220 may be configured to or may comprise means for detecting person 110 in a plurality of image frames (e.g., including image frame 100) captured by the camera, wherein the plurality of image frames depict access point 102 providing egress and ingress to the environment. In some aspects, the plurality of image frames are received in real-time from the camera as a live video feed.

At block 304, the method 300 includes tracking a movement of the person in the plurality of image frames. For example, in an aspect, computer device 200, processor 205, memory 210, OC component 215, and/or tracking component 225 may be configured to or may comprise means for tracking a movement of person 110 in the plurality of image frames. For example, tracking component 225 may monitor and record where a point of interest on the person (e.g., on the head) is located in each frame of plurality of image frames.

At block 306, the method 300 includes determining that the person has crossed a boundary within the plurality of image frames. For example, in an aspect, computer device 200, processor 205, memory 210, OC component 215, and/or determining component 230 may be configured to or may comprise means for determining that person 110 has crossed boundary 104 within the plurality of image frames.

At block 308, the method 300 includes identifying a path of the person based on the tracked movement. For example, in an aspect, computer device 200, processor 205, memory 210, OC component 215, and/or identifying component 235 may be configured to or may comprise means for identifying path 112 of the person based on the tracked movement. Path 112 may comprise a plurality of points across the plurality of image frames where the point of interest was located.

At block 310, the method 300 includes determining whether a difference between the identified path and at least one target path associated with entering/exiting the environment exceed a threshold difference. For example, in an aspect, computer device 200, processor 205, memory 210, OC component 215, and/or determining component 240 may be configured to or may comprise means for determining whether a difference between the identified path and at least one target path associated with entering/exiting the environment exceed a threshold difference.

In some aspects, the difference is based on a distance between each point in the plurality of points of the identified path and each point in a plurality of points of the target path. It should be noted that there may be several target paths that can indicate successful entry/exit for the access point. Determining component may determine and evaluate the differences between the identified path and each target path. The threshold difference may represent a maximum distance beyond which two paths are considered dissimilar.

Suppose that the target path is represented by path 108, which may have a starting point p108_0 and an endpoint p108_100. Path 112 may have a starting point p112_0 and an end point p112_100. The difference between each consecutive point on the respective paths may be compared to one another. For example, the difference between point p112_0 and point 112_1 may be compared with the difference between point p108_0 and point p108_1. This ultimately leads to a comparison of several slopes (i.e., the differences). Because path 108 is a straight line, the slopes between consecutive points should be the same. However, because path 112 is a circular path, the slopes between consecutive points will be different. When comparing each respective slope on each path, determining component 240 may calculate a total difference between each respective slope. If the total difference exceeds a threshold difference, determining component 240 may identify path 112 as unorthodox.

In some aspects, each target path is represented by a respective vector. Determining component 240 may determine a vector representation of the identified path and compare the identified path's vector with each respective vector of the target paths. This comparison may include comparing the direction, magnitude, and distance of two pairs of vectors. In this case, the threshold difference is a function of the direction, magnitude, and distance.

In some aspects, each target path is represented by a best-fit line. Determining component 240 may also fit a line to the plurality of points associated with the identified path and subsequently compare the line to the other best-fit lines. This comparison may include comparing the first and last points, the slopes, etc. In this case, the threshold difference is a function of the first and last points and at least the slopes.

In response to determining that the difference exceeds the threshold difference (e.g., the path is unorthodox), method 300 advances to block 314. If the difference does not exceed the threshold difference, method 300 advances to block 316.

At block 312, the method 300 includes calculating a dwell time indicative of an amount of time that the person remains within the plurality of image frames. For example, in an aspect, computer device 200, processor 205, memory 210, OC component 215, and/or calculating component 245 may be configured to or may comprise means for calculating a dwell time indicative of an amount of time that person 110 remains within the plurality of image frames.

At block 314, the method 300 includes determining whether the dwell time is less than a target dwell time. For example, in an aspect, computer device 200, processor 205, memory 210, OC component 215, and/or determining component 250 may be configured to or may comprise means for determining whether the dwell time is less than a target dwell time.

Suppose that person 110 is a security guard that crosses boundary 104 multiple times. As stated before, conventional systems would typically increment and decrement the occupancy count based on person 110's movement. However, person 110 should not be counted in the occupancy count. Path 112 of person 110 is circular (e.g., person 110 may simply be walking around the premises to ensure safety). Because path 112 is circular (i.e., unorthodox) and does not match a normal egress/ingress path such as path 108, which is a straight line towards access point 102, OC component 215 will determine that the difference between path 112 and a target path exceeds a threshold difference. Accordingly, calculating component 245 may determine a dwell time of person 110. Suppose that person 110 entered the frame at 1:00 pm following lunch. Image frame 100 may be taken at 1:01 pm. Calculating component 245 will determine that the dwell time is 1 minute. Determining component 250 may then retrieve, from memory 210, the target dwell time associated with access point 102. The target dwell time is a maximum amount of time it would take for a person to normally enter/exit via access point 102 once the person is detected. For example, on average it may take 10 seconds to leave the environment starting from the time when the person is detected by the camera. In this example, because 1 minute exceeds 10 seconds, determining component 250 may conclude that the dwell time exceeds the target dwell time.

In response to determining that the dwell time exceeds the target dwell time, method 300 advances to block 318, where updating component 255 does not update the occupancy count based on the identified path of the person. However, if at block 314, determining component 250 determines that the dwell time is less than the target dwell time, method 300 advances to block 316.

At block 316, the method 300 includes updating the occupancy count of the environment. For example, in an aspect, computer device 200, processor 205, memory 210, OC component 215, and/or updating component 255 may be configured to or may comprise means for updating the occupancy count of the environment. For example, if a person has entered the environment, the occupancy count is incremented by 1. If a person has exited the environment, the occupancy count is decremented by 1. Even if a person uses an unorthodox path to enter/exit the environment, if the person does not have a large dwell time (e.g., less than the average entering/exiting time), the occupancy count is updated.

In some optional aspects, OC component 215 learns from the identified path.

At block 320, the method 300 includes optionally updating the at least one target path based on the identified path of the person. For example, in an aspect, computer device 200, processor 205, memory 210, OC component 215, and/or updating component 260 may be configured to or may comprise means for updating the at least one target path based on the identified path of the person. For example, if the path is not close to an existing target path, but the dwell time is less than the target dwell time, the path can be included as a target path for the future.

At block 322, the method 300 includes optionally updating the target dwell time based on the dwell time of the person. For example, in an aspect, computer device 200, processor 205, memory 210, OC component 215, and/or updating component 260 may be configured to or may comprise means for updating the target dwell time based on the dwell time of the person. For example, updating component 260 may include the dwell time of the person in the average dwell time calculation, which determines the target dwell time. In some aspects, this updating may be performed when the difference between the identified path and the target path does not exceed the threshold difference.

In some aspects, OC component 215 is further configured to update a user interface on a display to present the updated value of the occupancy count. In some aspects, OC component 215 is further configured to generate an alert in response to determining that the updated value of the occupancy count is greater than a threshold occupancy count (e.g., 30), and output the alert on a computing device.

Additional implementations of the present disclosure may include one or more of the following aspects.

Aspect 1: A method for tracking by a vision system, comprising: detecting a person in a plurality of image frames captured by a camera, wherein the plurality of image frames depict an access point providing egress and ingress to the environment; tracking a movement of the person in the plurality of image frames; determining that the person has crossed a boundary within the plurality of image frames; identifying a path of the person based on the tracked movement; comparing the identified path with at least one target path associated with entering or exiting the environment; calculating a dwell time indicative of an amount of time that the person remains within the plurality of image frames, in response to determining that a difference between the identified path and the at least one target path exceeds a threshold difference; comparing the dwell time to a target dwell time; updating the occupancy count of the environment in response to determining that the dwell time is less than the target dwell time; and storing, in a memory, an updated value for the occupancy count.

Aspect 2: The method of Aspect 1, wherein the target dwell time is an average dwell time calculated based on historic ingress and egress data associated with the access point, further comprising: updating the at least one target path based on the identified path of the person; and updating the target dwell time based on the dwell time of the person.

Aspect 3: The method of any of the preceding Aspects, wherein crossing the boundary is indicative of entering or exiting the environment.

Aspect 4: The method of any of the preceding Aspects, wherein the environment has a plurality of access points, and each access point has at least one target path associated with entering the environment and at least one target path associated with exiting the environment.

Aspect 5: The method of any of the preceding Aspects, further comprising: selecting the at least one target path to compare with the identified path based on the access point depicted in the plurality of image frames.

Aspect 6: The method of any of the preceding Aspects, further comprising: wherein updating the occupancy count of the environment is further in response to determining that the difference between the identified path and the at least one target path does not exceed the threshold difference.

Aspect 7: The method of any of the preceding Aspects, further comprising: not updating the occupancy count of the environment in response to determining that the dwell time is greater than the target dwell time.

Aspect 8: The method of any of the preceding Aspects, wherein the path is a combination of vectors.

Aspect 9: The method of any of the preceding Aspects, wherein the plurality of image frames are received in real-time from the camera as a live video feed.

Aspect 10: The method of any of the preceding Aspects, further comprising: updating a user interface on a display to present the updated value of the occupancy count.

Aspect 11: The method of any of the preceding Aspects, further comprising: generating an alert in response to determining that the updated value of the occupancy count is greater than a threshold occupancy count; and outputting the alert on a computing device.

Additional Aspects may include a vision system comprising: a camera; a memory; and a processor communicatively coupled with the memory and configured to perform any of Aspect 1 to Aspect 11.

Further Aspects may include a computer-readable medium storing instructions, for use by a vision system tracking occupancy count in an environment based on detected movements, executable by a processor to perform the method of any of Aspect 1 to Aspect 11.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A vision system, comprising:
   a camera;
   a memory; and
   a processor communicatively coupled with the memory and configured to:
   detect a person in a plurality of image frames captured by the camera, wherein the plurality of image frames depict an access point providing egress and ingress to an environment;
   track a movement of the person in the plurality of image frames;
   determine that the person has crossed a boundary within the plurality of image frames;
   identify a path of the person based on the tracked movement;
   compare the identified path with at least one target path associated with entering or exiting the environment;
   calculate a dwell time indicative of an amount of time that the person remains within the plurality of image frames, in response to determining, based on comparing, that a difference between the identified path and the at least one target path exceeds a threshold difference;
   compare the dwell time to a target dwell time;
   update an occupancy count of the environment in response to determining that the dwell time is less than the target dwell time; and
   store, in the memory, an updated value for the occupancy count.

2. The vision system of claim 1, wherein the target dwell time is an average dwell time calculated based on historic ingress and egress data associated with the access point, wherein the processor is further configured to:
   update the at least one target path based on the identified path of the person; and
   update the target dwell time based on the dwell time of the person.

3. The vision system of claim 1, wherein crossing the boundary is indicative of entering or exiting the environment.

4. The vision system of claim 1, wherein the environment has a plurality of access points, and each access point has at least one target path associated with entering the environment and at least one target path associated with exiting the environment.

5. The vision system of claim 4, wherein the processor is further configured to:
   select the at least one target path to compare with the identified path based on the access point depicted in the plurality of image frames.

6. The vision system of claim 1, wherein the processor is further configured to update the occupancy count of the environment in response to determining that the difference between the identified path and the at least one target path does not exceed the threshold difference.

7. The vision system of claim 1, wherein the processor is further configured to:
   not update the occupancy count of the environment in response to determining that the dwell time is greater than the target dwell time.

8. The vision system of claim 1, wherein the path is a combination of vectors.

9. The vision system of claim 1, wherein the plurality of image frames are received in real-time from the camera as a live video feed.

10. The vision system of claim 1, wherein the processor is further configured to:
    update a user interface on a display to present the updated value of the occupancy count.

11. The vision system of claim 1, wherein the processor is further configured to:
    generate an alert in response to determining that the updated value of the occupancy count is greater than a threshold occupancy count; and
    output the alert on a computing device.

12. A method for tracking by a vision system, comprising:
    detecting a person in a plurality of image frames captured by a camera, wherein the plurality of image frames depict an access point providing egress and ingress to an environment;
    tracking a movement of the person in the plurality of image frames;
    determining that the person has crossed a boundary within the plurality of image frames;
    identifying a path of the person based on the tracked movement;
    comparing the identified path with at least one target path associated with entering or exiting the environment;
    calculating a dwell time indicative of an amount of time that the person remains within the plurality of image frames, in response to determining that a difference between the identified path and the at least one target path exceeds a threshold difference;

comparing the dwell time to a target dwell time;

updating an occupancy count of the environment in response to determining that the dwell time is less than the target dwell time; and storing, in a memory, an updated value for the occupancy count.

13. The method of claim 12, wherein the target dwell time is an average dwell time calculated based on historic ingress and egress data associated with the access point, further comprising:

updating the at least one target path based on the identified path of the person; and updating the target dwell time based on the dwell time of the person.

14. The method of claim 12, wherein crossing the boundary is indicative of entering or exiting the environment.

15. The method of claim 12, wherein the environment has a plurality of access points, and each access point has at least one target path associated with entering the environment and at least one target path associated with exiting the environment.

16. The method of claim 15, further comprising:

selecting the at least one target path to compare with the identified path based on the access point depicted in the plurality of image frames.

17. The method of claim 12, further comprising:

wherein updating the occupancy count of the environment is further in response to determining that the difference between the identified path and the at least one target path does not exceed the threshold difference.

18. The method of claim 12, further comprising:

not updating the occupancy count of the environment in response to determining that the dwell time is greater than the target dwell time.

19. The method of claim 12, wherein the path is a combination of vectors.

20. The method of claim 12, wherein the plurality of image frames are received in real-time from the camera as a live video feed.

21. The method of claim 12, further comprising:

updating a user interface on a display to present the updated value of the occupancy count.

22. The method of claim 12, further comprising:

generating an alert in response to determining that the updated value of the occupancy count is greater than a threshold occupancy count; and outputting the alert on a computing device.

23. A non-transitory computer-readable medium storing instructions, for use by a vision system tracking occupancy count in an environment based on detected movements, executable by a processor to:

detect a person in a plurality of image frames captured by a camera, wherein the plurality of image frames depict an access point providing egress and ingress to the environment;

track a movement of the person in the plurality of image frames;

determine that the person has crossed a boundary within the plurality of image frames;

identify a path of the person based on the tracked movement;

compare the identified path with at least one target path associated with entering or exiting the environment;

calculate a dwell time indicative of an amount of time that the person remains within the plurality of image frames, in response to determining, based on comparing, that a difference between the identified path and the at least one target path exceeds a threshold difference;

compare the dwell time to a target dwell time;

update an occupancy count of the environment in response to determining that the dwell time is less than the target dwell time; and store, in a memory, an updated value for the occupancy count.

* * * * *